US010397383B2

(12) United States Patent
Duffy et al.

(10) Patent No.: US 10,397,383 B2
(45) Date of Patent: Aug. 27, 2019

(54) MOUNTING APPARATUS FOR LIGHT SOCKET

(71) Applicant: Canadian Tire Corporation, Limited, Toronto, Ontario (CA)

(72) Inventors: Allison Duffy, Toronto (CA); Tony Laguardia, Aurora (CA); Anthony Wolf, Toronto (CA); Shannon Lynar, Orangeville (CA)

(73) Assignee: Canadian Tire Corporation, Limited, Toronto, Ontario (CA)

( * ) Notice: Subject to any disclaimer, the term of this patent is extended or adjusted under 35 U.S.C. 154(b) by 92 days.

(21) Appl. No.: 15/515,305

(22) PCT Filed: Sep. 29, 2014

(86) PCT No.: PCT/CA2014/050932
§ 371 (c)(1),
(2) Date: Mar. 29, 2017

(87) PCT Pub. No.: WO2016/049731
PCT Pub. Date: Apr. 7, 2016

(65) Prior Publication Data

US 2017/0237841 A1 Aug. 17, 2017

(51) Int. Cl.
*H02G 3/32* (2006.01)
*H04M 1/02* (2006.01)
(Continued)

(52) U.S. Cl.
CPC ............ *H04M 1/0264* (2013.01); *A45C 3/00* (2013.01); *A45C 3/06* (2013.01); *A45C 11/00* (2013.01);
(Continued)

(58) Field of Classification Search
CPC ............ H04M 1/0264; H04M 1/0281; H04M 1/0283; H04B 1/388; G03B 17/568;
(Continued)

(56) References Cited

U.S. PATENT DOCUMENTS 1,574,695 A * 2/1926 Riley ...................... F21V 21/08 24/332
2,930,075 A * 3/1960 Deutchman ............ E05D 11/06 16/375

(Continued)

FOREIGN PATENT DOCUMENTS

CN 203836887 U * 9/2014

*Primary Examiner* — J. Gregory Pickett
*Assistant Examiner* — Niki M Eloshway
(74) *Attorney, Agent, or Firm* — Patrick J. Hofbauer

(57) ABSTRACT

A mounting apparatus for a light socket assembly comprises an extension body connectable with the light socket assembly. The extension body defines a first arcuate surface extending from the extension body. A clamping assembly has a second arcuate surface extending from the clamping assembly. The first arcuate surface and the second arcuate surface are each contoured to conform with and to pivotally contact each other, at least in part, with sufficient friction that the extension body and the clamping assembly are selectively positionable and pivotally movable relative to each other in response to intentional repositioning of the extension body and the clamping assembly relative to each other. The apparatus thus provides for mounting of a light socket assembly on a wide variety of environmental items, such as, for example, trees, eavestroughs and the like, and is particularly useful for mounting a string of wired festive lights, such as Christmas lights.

25 Claims, 9 Drawing Sheets

100 901 114 112 126 124 106 114 903 122 900 102 103 110 902

(51) Int. Cl.

| | |
|---|---|
| ***A45C 3/00*** | (2006.01) |
| ***A45C 3/06*** | (2006.01) |
| ***A45C 11/00*** | (2006.01) |
| ***A45C 11/38*** | (2006.01) |
| ***A45C 13/02*** | (2006.01) |
| ***H04B 1/3888*** | (2015.01) |
| *H02G 3/00* | (2006.01) |
| *G03B 17/56* | (2006.01) |

(52) U.S. Cl.
CPC .............. *A45C 11/38* (2013.01); *A45C 13/02* (2013.01); *H04B 1/3888* (2013.01); *H04M 1/0281* (2013.01); *H04M 1/0283* (2013.01); *A45C 2011/002* (2013.01); *A45C 2011/003* (2013.01); *G03B 17/568* (2013.01)

(58) Field of Classification Search
CPC .. A45C 3/00; A45C 3/06; A45C 11/00; A45C 11/38; A45C 13/02; A45C 11/002; A45C 11/003
USPC ........... 220/3.9, 831, 832, 840; 16/224, 252, 16/374, 375, 376
See application file for complete search history.

(56) References Cited

U.S. PATENT DOCUMENTS

| | | | | |
|---|---|---|---|---|
| 4,678,153 | A * | 7/1987 | Maddock | F21L 14/02 24/339 |
| D349,584 | S * | 8/1994 | Carlisle | D26/138 |
| 5,609,415 | A * | 3/1997 | Protz, Jr. | F21V 21/08 248/229.16 |
| 6,792,653 | B2 * | 9/2004 | Protz | A47G 33/10 24/343 |
| D751,377 | S * | 3/2016 | Duffy | D8/395 |
| D770,033 | S * | 10/2016 | Ksiazek | D23/411 |
| 2003/0235053 | A1 * | 12/2003 | Jones | F21V 17/007 362/396 |
| 2012/0124776 | A1 * | 5/2012 | McDonnell | E05D 11/06 16/375 |
| 2013/0148366 | A1 * | 6/2013 | Adams, IV | F21V 21/088 362/396 |
| 2014/0041155 | A1 * | 2/2014 | Hsu | G06F 1/1681 16/374 |

* cited by examiner

MOUNTING APPARATUS FOR LIGHT SOCKET

FIELD OF THE INVENTION

The present invention relates generally to the field of electrical lighting systems, and more particularly to an apparatus for mounting light socket assemblies configured to receive a light-emitting device, such as, for example, an incandescent light bulb or LED light source, to trees, buildings and the like.

BACKGROUND AND SUMMARY OF THE INVENTION

Electrical lighting systems are configured to provide one or more light-emitting devices to achieve a practical effect and/or an aesthetic effect. Electrical lighting systems can enhance task performance, improve the appearance of an area, and/or have a positive psychological effect on people. Many decorative electrical lighting systems comprise a plurality of light sockets each having a light emitting device operatively mounted in each respective light socket, with the plurality of sockets connected together by electrical wires to form a string of lights, such as, for example, Christmas lights, Halloween lights, patio lights, or other decorative festive lights. It is particularly challenging to reliably attach and then detach such a string of decorative festive lights to, for example an environmental item, such as, for example, a tree, an ornamental shrub, an eavestrough, or the roof edge of a house or other structure. This task can be time consuming, uncomfortable and physically challenging. Moreover, it can be dangerous when carried out from a ladder, or other elevated platform, particularly in cold, wet, or icy environments.

To be acceptable for large scale domestic consumer use, such strings of decorative festive lights must remain relatively inexpensive to purchase, as compared to, for example, permanent commercial or residential lighting systems. Additionally, any clips, clamps, or other means used to mount strings of decorative festive lights to trees, buildings or other environmental items, as aforesaid, should preferably be quick and easy to install and uninstall, be reusable and robust, yet remain inexpensive to purchase. Most of the prior art clips, clamps, hooks, tabs or other means available to mount strings of decorative festive lights as aforesaid are not particularly robust or quick and easy to use. Some are not reusable. Others additionally require nails, tacks, staples, wires, and/or hand tools to install. This is particularly cumbersome and/or dangerous under the difficult conditions of installation referenced above. Moreover, many prior art mounting devices suitable for this purpose become easily detached from their respective light sockets in use, particularly during installation or de-installation, following which they may be easily lost or damaged. Once mounted, most do not provide for any significant or consistent degree of adjustment of the mounting angle of the light socket relative to the environmental item on which they are mounted. Given the lack of such adjustment and the lack of surface uniformity inherent to many of the environmental items on which they are typically mounted, a string of decorative festive lights installed according to the prior art often appear irregular and uneven from a distance, which result may be aesthetically unacceptable to some users. As such, prior art mounting means intended to facilitate such installations are unsatisfactory from numerous standpoints.

To obviate or mitigate at least one of these and possible other shortcomings associated with the prior art, there is provided according to the present invention an improved mounting apparatus for a light socket assembly.

According to one aspect of the present invention, such apparatus has an extension body connectable to the light socket assembly. The extension body defines a first arcuate surface extending form the extension body. The apparatus also includes a clamping assembly having a second arcuate surface formed to and extending from the clamping assembly. The first arcuate surface and the second arcuate surface are each contoured to conform to each other and to frictionally, pivotally contact each other. The first arcuate surface and the second arcuate surface frictionally, pivotally contact, at least in part, with each other with sufficient friction that the extension body and the clamping assembly are frictionally positionable and pivotally movable relative to each other. The first arcuate surface and the second arcuate surface are pivotally movable relative to each other in response to intentional repositioning of the extension body and the clamping assembly relative to each other.

According to another aspect of the present invention, the connection of the extension body to the light socket is selective. Optionally, but not essentially, such selective engagement may be achieved by the extension body having a sleeve portion defining an inner surface configured to selectively snap fit with an exterior side wall of the light socket assembly.

According to yet another aspect of the present invention there is provided an apparatus comprising a light-emitting device and a light socket assembly configured to operatively receive the light-emitting device. An extension body is connectable to the light socket assembly. The extension body defines a first arcuate surface being integrally formed with and extending from the extension body. A clamping assembly has a second arcuate surface that is formed with and extends from the clamping assembly. The first arcuate surface and the second arcuate surface are each contoured to conform with each other and to frictionally pivotally contact each other, at least in part, with sufficient friction that the extension body and the clamping assembly are frictionally positionable and pivotally movable relative to each other in response to intentional repositioning of the extension body and the clamping assembly relative to each other.

These and other aspects, non-limiting embodiments, advantages, features and characteristics of the present invention, as well as methods of operation and functions of the related elements of the structure, and the combination of parts and economies of manufacture, will become more apparent to those skilled in the art upon consideration of the following detailed description and the appended claims with reference to the accompanying drawings, the latter of which is briefly described hereinbelow.

DESCRIPTION OF THE DRAWINGS

Several non-limiting embodiments will be more fully appreciated by reference to the detailed description of the non-limiting embodiments which follows, when taken in conjunction with the accompanying drawings, in which:

FIG. 2*e*–1 is an isometric view of a portion of the clamping assembly of FIG. 2*e;*

Figure 1:
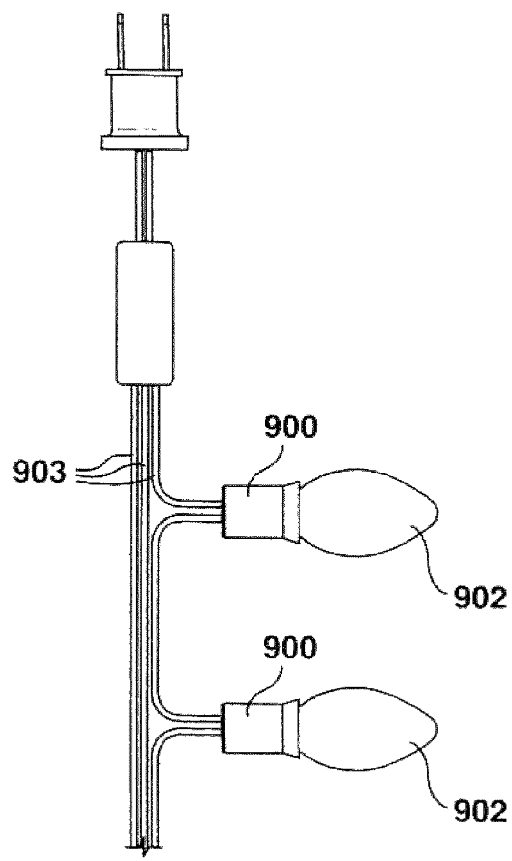
FIG. 1 is a side elevational view of a plurality of light socket assemblies operatively connected together by electrical wires to form a string of decorative festive lights of the general type that may be used in conjunction with a mounting apparatus constructed according to the present invention.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the various views. Elements in the figures are illustrated for simplicity and clarity and have not been drawn to scale. The dimensions of some of the elements in the figures may be emphasized relative to other elements for facilitating an understanding of the disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 apparatus
102 extension body
103 oppositely spaced outwardly flared lip portions
104 first arcuate surface
106 clamping assembly
107 biasing member
108 second arcuate surface
110 sleeve portion
112 opposed clamping jaws
114 opposed clamp handles
116 molded one-piece body
118 molded one-piece body
119 inner surface
120 shaft portion
122 C-shaped portion
124 first jaw portion
126 second jaw portion
128 first selected pivoted position
130 second selected pivoted position
200 crevice
201 flat zones
202 protrusions
203 receiving zone
205 pivot axis
900 light socket assembly
901 longitudinal axis
902 light-emitting device
903 electrical wires
904 string of decorative, festive lights
906 exterior sidewall
907 outwardly facing groove
909 pivoting force
910 eaves trough
911 outer sidewall
912 lip portion

DETAILED DESCRIPTION OF NON-LIMITING EMBODIMENTS

The following detailed description is merely exemplary and is not intended to limit the described embodiments or the application and the uses of the described embodiments. As used, the word "exemplary" or "illustrative" means "serving as an example, instance, or illustration." Implementations described as "exemplary" or "illustrative" are not necessarily to be construed as preferred or advantageous over other implementations. The exemplary embodiments are provided to enable persons skilled in the art to make or use the embodiments of the disclosure and are not intended to limit the scope of the disclosure. The scope of the invention is defined by the claims. Terms such as upper, lower, left, rear, right, front, side, top, bottom, rear, vertical, horizontal, and derivatives thereof shall relate to the examples as oriented in the drawings. There is no intention to be bound by any expressed or implied theory in the preceding Field of the Invention or Background and Summary of the Invention sections, or in the following Detailed Description section. It is understood that the devices illustrated in the attached drawings, and described in the following detailed description, are exemplary embodiments (examples) only exhibiting aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a", and the phrase "a plurality" is equivalent to "two or more". While aspects (examples, alterations, modifications, options, variations, embodiments and any equivalent thereof) are described in this section having regard the appended drawings, it should be understood that the invention is limited to the subject matter provided by the claims, only, and that the invention is not limited in any manner to the particular aspects described in this section or illustrated in the appended figures.

Referring to FIG. 1, there will be seen a side elevational view of a plurality of light socket assemblies 900 spaced from one another along and operatively connected to electrical wires 903, thereby to form a string 904 of decorative, festive lights of a well-known type that may be used in conjunction with a mounting apparatus constructed according to the present invention. Each of the light socket assemblies 900 making up the string 904 of decorative, festive lights is adapted and otherwise configured in a known manner to operatively receive a light-emitting device 902, which device may be an incandescent light bulb, a quartz-halogen light bulb, a compact florescent light bulb, a light emitting diode (LED), or any other conventional device configured to emit light visible to a person. The light-emitting devices 902 generate light by consuming electric current provided by the electrical wires 903, which are connected to each of the light socket assemblies 900 in a conventional manner (parallel or series) as is well known in the lighting arts.

Referring now to FIGS. 2*a*, 2*b*, 2*c* and 2*d*, there will be seen a first exemplary embodiment of a mounting apparatus 100 according to the present invention. The apparatus 100 is adapted and configured for use with, inter alia, a light socket assembly 900 as illustrated in FIG. 1. As such, it will be readily appreciated that, by using a respective clamping apparatus 100 connected to each of the light socket assemblies 900 making up a string 904 of decorative, festive lights, the string 904 of decorative, festive lights may be quickly and securely mounted on (and dismounted from) an environmental item, such as a tree, an ornamental shrub, an eavestrough, or the roof edge of a house or other structure.

To this end, the apparatus 100 comprises an extension body 102 which has a sleeve portion 110 defining an inner surface 119. The inner surface 119 (best seen in FIG. 2*d*) is configured to selectively snap fit with the exterior sidewall 906 of the light socket assembly 900.

Figure 2B:
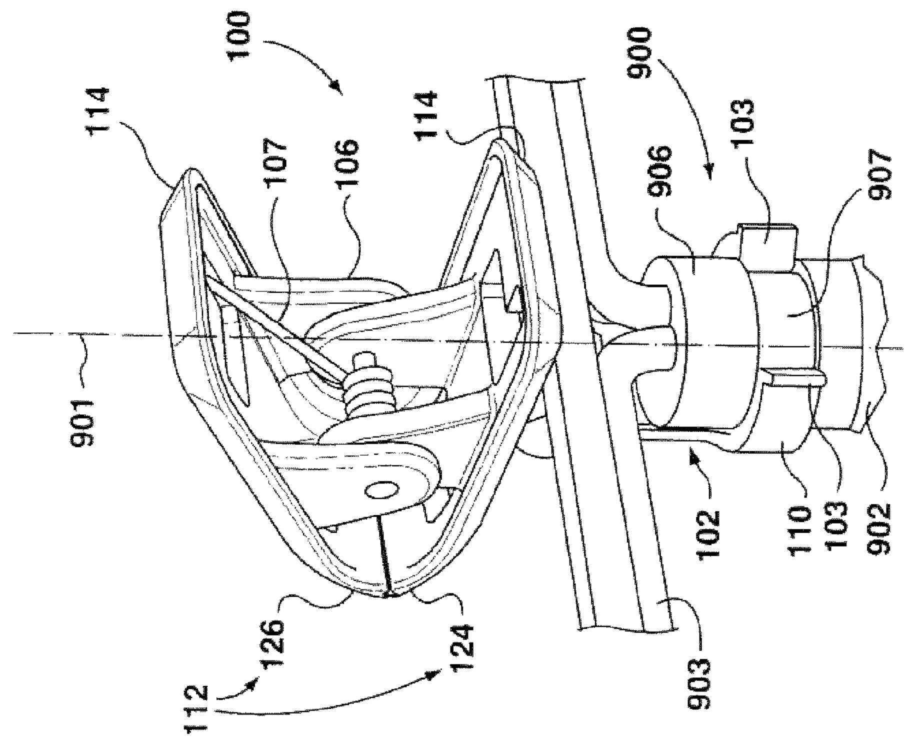
FIGS. 2*a* and 2*b* are side perspective views, from opposite directions, illustrating a first embodiment of a mounting apparatus according to the present invention configured for use with a form of light socket assembly generally similar to that shown in FIG. 1, with the light emitting device being partially cut-away for ease of illustration.

More specifically, the extension body 102 preferably, but not essentially, provides (forms) a C-shaped clip formation optionally having oppositely spaced outwardly flared lip portions 103,103 forming an entrance leading to an interior zone of the C-shaped clip formation. The C-shaped clip formation is preferably formed from a resilient metal or plastics material, and may be called a snap-fit member, or a snap clip formation. The exterior sidewall 906 of the light socket assembly 900 preferably, but not essentially, defines an outwardly facing circumferential groove 907 (as best seen in FIGS. 2*b* and 2*c*) in which the C-shaped clip formation may be more positively located relative to the light socket assembly 900. Moreover, the outwardly facing groove 907 is configured to interface with the inwardly facing surface of the C-shaped clip formation, with the oppositely spaced outwardly flared lip portions 103,103 contacting, at least in part, the outwardly facing groove 907 to assist with initial entry of the C-shaped clip formation of the extension body 102 within the outwardly facing groove 907 upon connection of the extension body 102 to the light socket assembly 900. In this manner, the extension body 102 is configured to be selectively and rotatably connectable to the outwardly facing groove 907 defined by the light socket assembly 900 (once the extension body 102 is received within the outwardly facing groove 907). Specifically, the C-shaped portion of the extension body 102 is received in, or snap fitted to, the outwardly facing groove 907 provided by the light socket assembly 900. Once received, the extension body 102 may be rotatably movable relative to the light socket assembly 900 (about a longitudinal axis 901 extending through the light socket assembly 900), which rotation provides additional utility in attaining consistent and even placement of the light socket assemblies 900 making up the string 904 of decorative, festive lights.

Figure 2A:
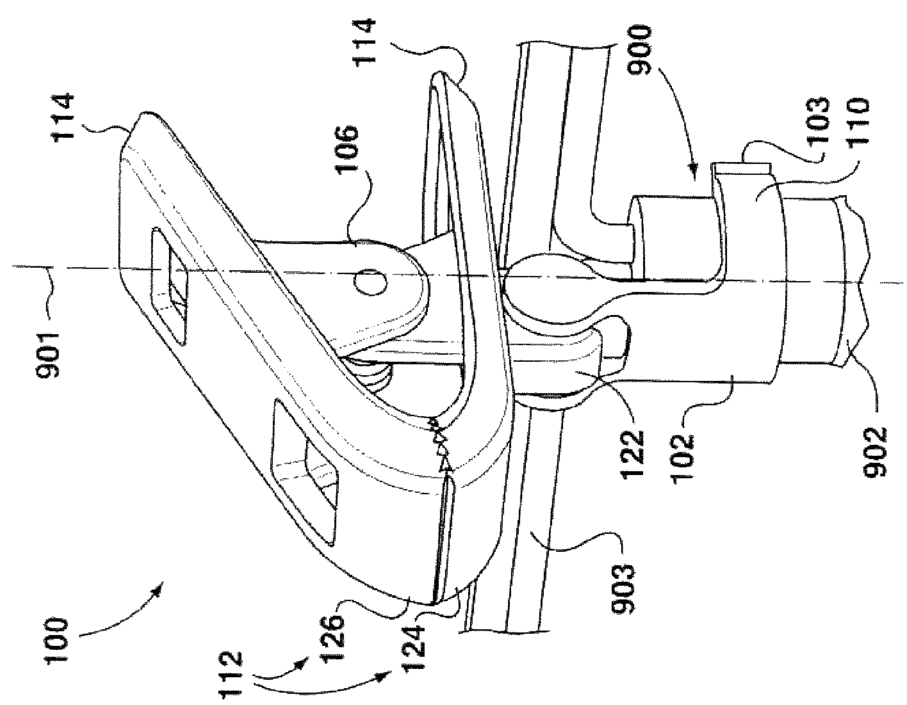
Figure 2C:
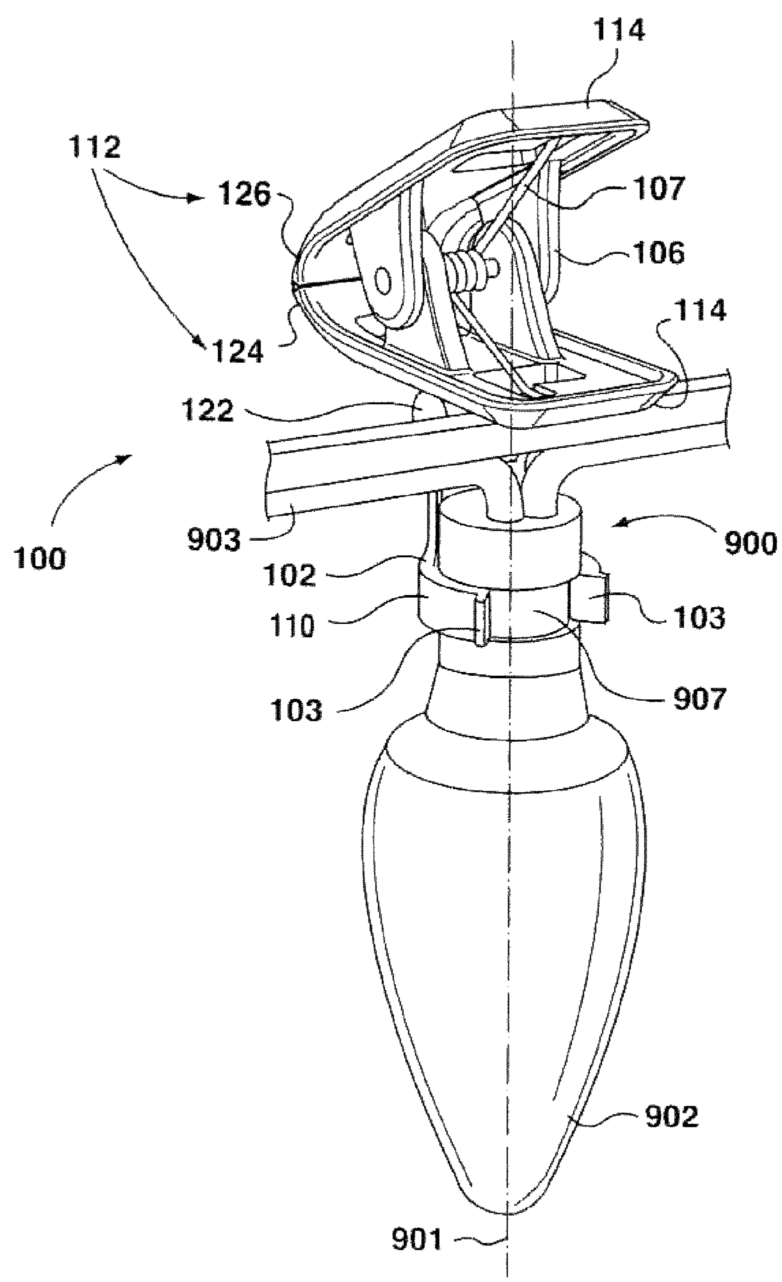
FIG. 2*c* is a perspective view similar to FIG. 2*b*, showing in its entirety the light emitting device partially cut-away in FIGS. 2*a* and 2*b;*

Still referring to the first embodiment depicted in FIGS. 2*a*, 2*b* and 2*c*, a clamping assembly 106 preferably includes a biasing member 107 positioned between opposed clamping jaws 112,112, as shown in FIGS. 2*a*, 2*b* and 2*c*. The biasing member 107 may include a spring member, being, for example, a torsion spring, as illustrated. The biasing member 107 is configured to urge the opposed clamping jaws 112, 112 together towards their closed configuration, as shown in FIGS. 2*a*, 2*b* and 2*c*. Opposed clamp handles 114,114 extend from respective instances of the opposed clamping jaws 112,112 for gripping by a user. In response to the opposed clamp handles 114,114 receiving a clamping-opening force sufficient to overcome the biasing member 107, the opposed clamping jaws 112, 112 are urged to separate from each other into a spaced apart condition. In this manner, the clamping assembly 106 has opposed clamping jaws 112, 112 that are spring-biased and pivotally movable, with opposed clamp handles 114 extending therefrom.

The clamping assembly 106 may be used to clamp the light socket assembly 900 to an environmental item such as a tree branch, an ornamental shrub, an eavestrough, or the roof edge of a house, or other structure.

A mounting apparatus 100 according to the invention includes, inter alia the extension body 102 and the clamping assembly 106. As seen in the figures, the extension body 102 has (provides or defines) the first arcuate surface 104. The first arcuate surface 104 is preferably, integrally formed to (and extends from) the extension body 102, as shown in the figures.

The clamping assembly 106 also has (provides or defines) a second arcuate surface 108. The second arcuate surface 108 is preferably, but not essentially, integrally formed with and extends from a selected one of the opposed clamping jaws 112, being the first jaw portion 124, as shown in the appended figures. In this manner, the second arcuate surface 108 and the clamping assembly 106 may form a unitary molded body (if desired).

The first arcuate surface 104 of the extension body 102 and the second arcuate surface 108 of the clamping assembly 106 are each contoured to closely conform to each other so as to frictionally pivotally contact each other. More particularly, the first arcuate surface 104 and the second arcuate surface 108 frictionally pivotally contact, at least in part, with each other with sufficient rotating friction to at least partially arrest free pivotal movement. This is accomplished through close tolerancing of the contacting parts jointly and severally with the selection of materials having co-efficients of friction sufficient to achieve the desired end result. As such, the extension body 102 and the clamping assembly 106 remain frictionally positionable and movable relative to each other. The first arcuate surface 104 and the second arcuate surface 108 are preferably configured to snap fit with each other (or to slide fit with each other). In this manner, the first arcuate surface 104 and the second arcuate surface 108 frictionally pivotally couple the extension body 102 with the clamping assembly 106 and the first arcuate surface 104 and the second arcuate surface 108 are frictionally movable relative to each other in response to the intentional repositioning of the extension body 102 and the clamping assembly 106 relative to each other.

As seen in detail in FIGS. 2*d* through 2*i*, inclusive, preferably, but not essentially, as an option, first arcuate surface 104 and the second arcuate surface 108 may be configured to detent connect with each other in response to relative pivotal motion between the first arcuate surface 104 and the second arcuate surface 108, such that, the first arcuate surface 104 and the second arcuate surface 108 click stop at a predetermined position (or at least one or more predetermined positions). This is done in such a way that the light-emitting device 902 is positioned at a predetermined orientation once the first arcuate surface 104 and the second arcuate surface 108 detent connect (click snap) together at the predetermined position.

Referring to FIGS. 2*d*, 2*e*, 2*e*–1, 2*f*, 2*g*, 2*h*, and 2*i*, the first arcuate surface 104 and the second arcuate surface 108 are configured to detent connect with each other in response to relative rotational motion between the first arcuate surface 104 and the second arcuate surface 108. The first arcuate surface 104 and the second arcuate surface 108 click stop at a predetermined position (or at least one or more predetermined positions). This is done in such a way that the light-emitting device 902 is positioned at a predetermined orientation once the first arcuate surface 104 and the second arcuate surface 108 detent connect (click snap) together at the predetermined position.

Figure 2D:
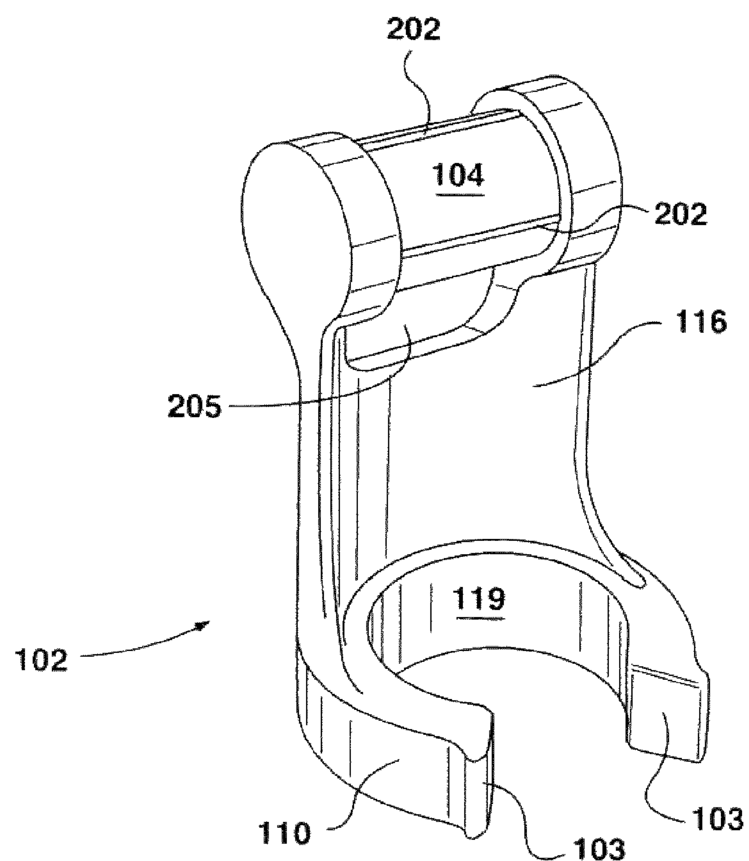
FIG. 2*d* is an isometric view (on an enlarged scale) of the extension body depicted in FIGS. 2*a* to 2*c;*
Figure 2E:
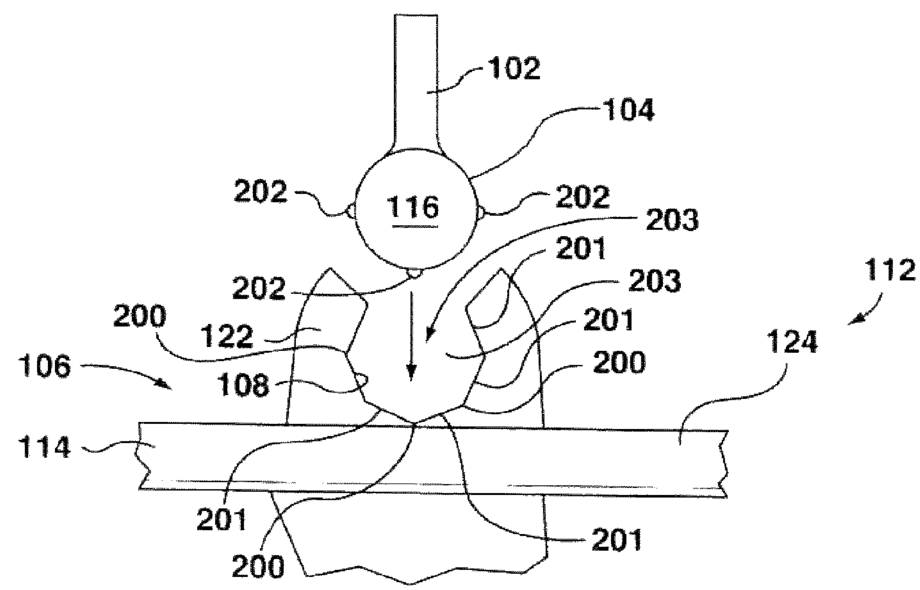
FIG. 2*e* is an exploded partial side elevational view (on an enlarged scale) showing a portion of an extension body and a portion of a clamping assembly each having optionally modified first and second arcuate surfaces adapted to provide relative rotation thereof between four predetermined positions.
Figures 1, 2E:
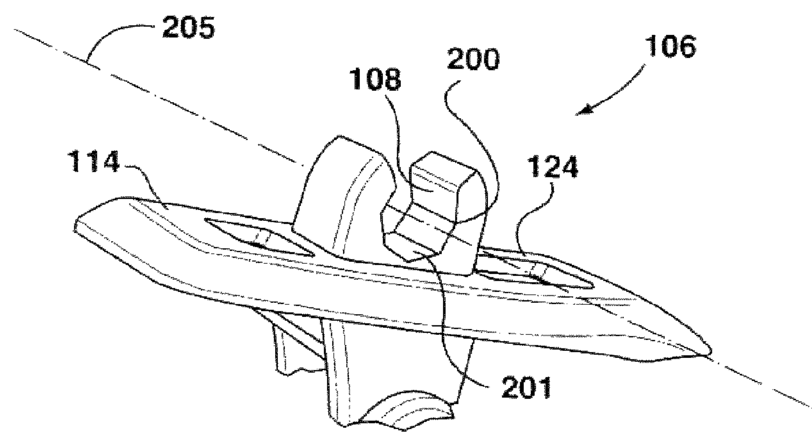

In this regard, and referring more particularly to FIGS. 2*e*, and 2*e*–1, the first jaw portion 124 of the clamping assembly 106 provides the second arcuate surface 108. The second arcuate surface 108 defines a receiving zone 203 (a C-shaped receiving zone) configured to receive the first arcuate surface 104 defined by the extension body 102. The C-shaped portion extends from the clamping assembly 106 (such as from the first jaw portion 124 and/or the opposed clamp handles 114). The C-shaped portion is configured to be resiliently deformable. The second arcuate surface 108 preferably defines (provides) a plurality of flat zones 201 facing the interior of the receiving zone 203. It will be appreciated that the second arcuate surface 108 and the first arcuate surface 104 may provide a smooth continuous surface or an intermittently smooth surface. The flat zones 201 also face a pivot axis 205 that extends through the receiving zone 203. A crevice 200 is formed (positioned) at the intersections of the flat zones 201. The flat zones 201 are positioned at an acute angle relative to each other. The first arcuate surface 104 provides (defines) a plurality of protrusions 202 that are spaced apart from each other, and extend outwardly from the first arcuate surface 104. The crevices 200 of the flat zones 201 are configured to detentably interact with the protrusions 202 of the first arcuate surface 104. In this manner, the second arcuate surface 108 and the first arcuate surface 104 are configured to facilitate detent relationship with each other. In this way, the extension body 102 and the clamping assembly 106 are pivotally movable relative to each other, and are lockably positionable at predetermined locations (as depicted in FIGS. 2*f*, 2*g*, 2*h* and 2*i*) once rotated by a user to the predetermined positions.

Referring to FIGS. 2*d*, 2*e*, and 2*e*–1, the extension body 102 is positioned in such a way that the first arcuate surface 104 is insertable into the receiving zone 203. The C-shaped portion resiliently deforms in response to receiving the first arcuate surface 104 in the receiving zone 203 of the C-shaped portion. In order to insert or remove the first arcuate surface 104 from the receiving zone 203, a force must be applied to the first arcuate surface 104 in order to overcome the resiliently C-shaped portion.

Figure 2G:
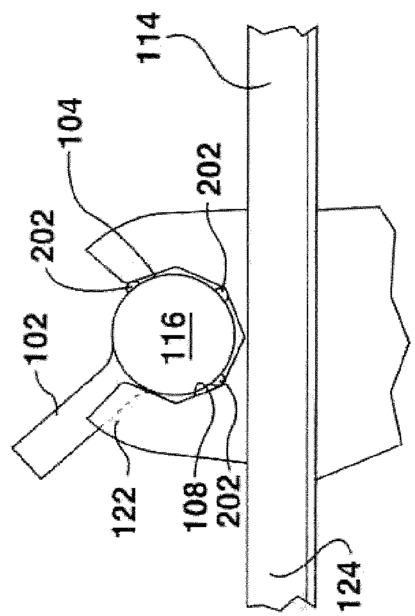
FIGS. 2*f* to 2*i* are partial side elevational views of the modified extension body and first jaw portions of FIGS. 2*e* and 2*e*–1 shown in said four respective predetermined positions.
Figure 2I:
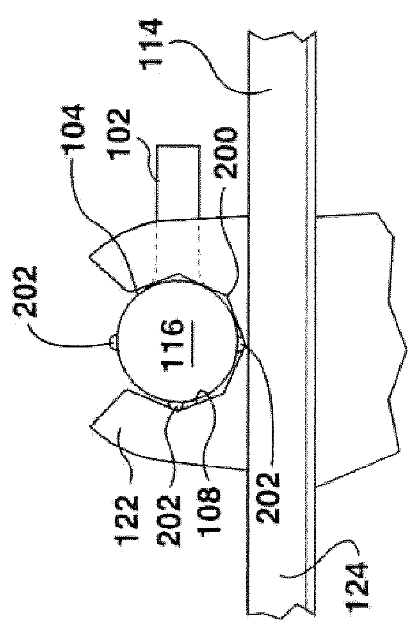
Figure 2F:
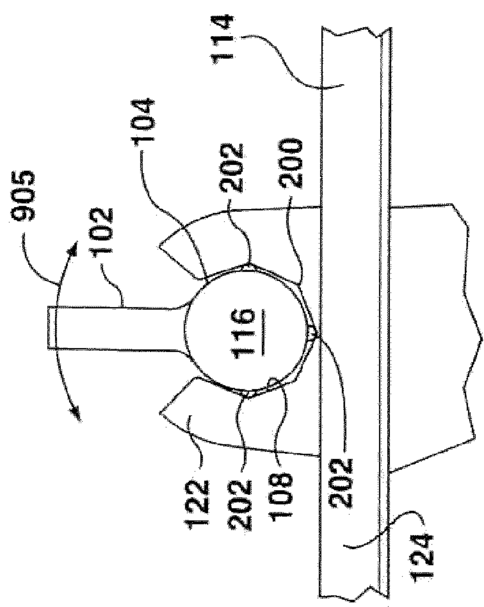

Referring to FIG. 2*f*, the first arcuate surface 104 is securely received in the receiving zone 203, and is in frictional contact with the second arcuate surface 108. The protrusions 202 contact respective crevices 200. This is done in such a way to position the first arcuate surface 104 at a predetermined locked position relative to the opposed clamping jaws 112 and clamp handles 114. A threshold torsional force would have to be applied to the extension body 102 in order to overcome the locked position depicted FIG. 2*f*. The protrusions 202 are positioned at respective instances of the crevices 200. The extension body 102 is movable about pivot axis 205 from side to side (as represented by curved arrow 905 in FIG. 2*f*) in response to the application of such a threshold rotational (pivotal) force (torque) to the extension body. The protrusion 202 positioned at the bottom side of the first arcuate surface 104 detentably engages the crevice 200 in such a way that the extension body 102 extends perpendicular from the clamping assembly 106. Once rotated to one side or the other side, the protrusions 202 become (momentarily) disengaged from their respective crevices 200 (in order to permit rotational movement of the extension body 102 about the pivot axis 205).

Figure 2H:
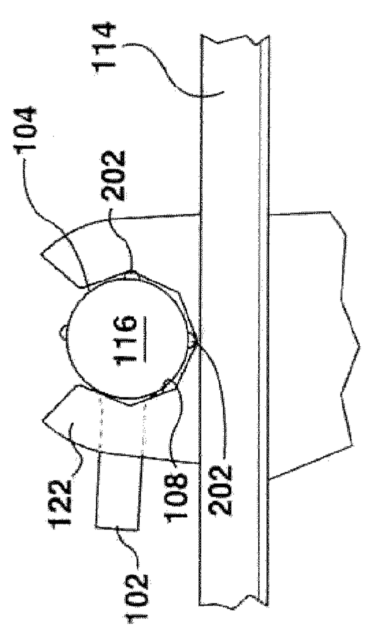

Referring to FIGS. 2*g* and 2*h*, the extension body 102 is rotated to the left, resulting in the protrusions 202 becoming engaged with respective crevices 200. In this way, the extension body 102 is detentably locked at two other predetermined positions (to one side of the clamping assembly 106).

Referring to FIG. 2*i*, the extension body 102 is rotated to the right, resulting in the protrusions 202 becoming engaged with respective crevices 200. In this way, the extension body 102 becomes detentably locked in another predetermined position (to an opposite side of the clamping assembly 106).

Modified first 104 and second 108 surfaces as depicted in FIGS. 2*d*, 2*e*, 2*e*–1, 2*f*, 2*g*, 2*h*, 2*i* and 2*j* may be optionally incorporated into any of the first, second and third exemplary embodiments disclosed herein, and such incorporation makes it considerably easier to install a string 904 of decorative festive lights on an environmental item in a consistently more even, regular and aesthetically pleasing configuration than is possible with prior art mounting devices intended for such mounting.

Figures 3A, 3B, 3C:
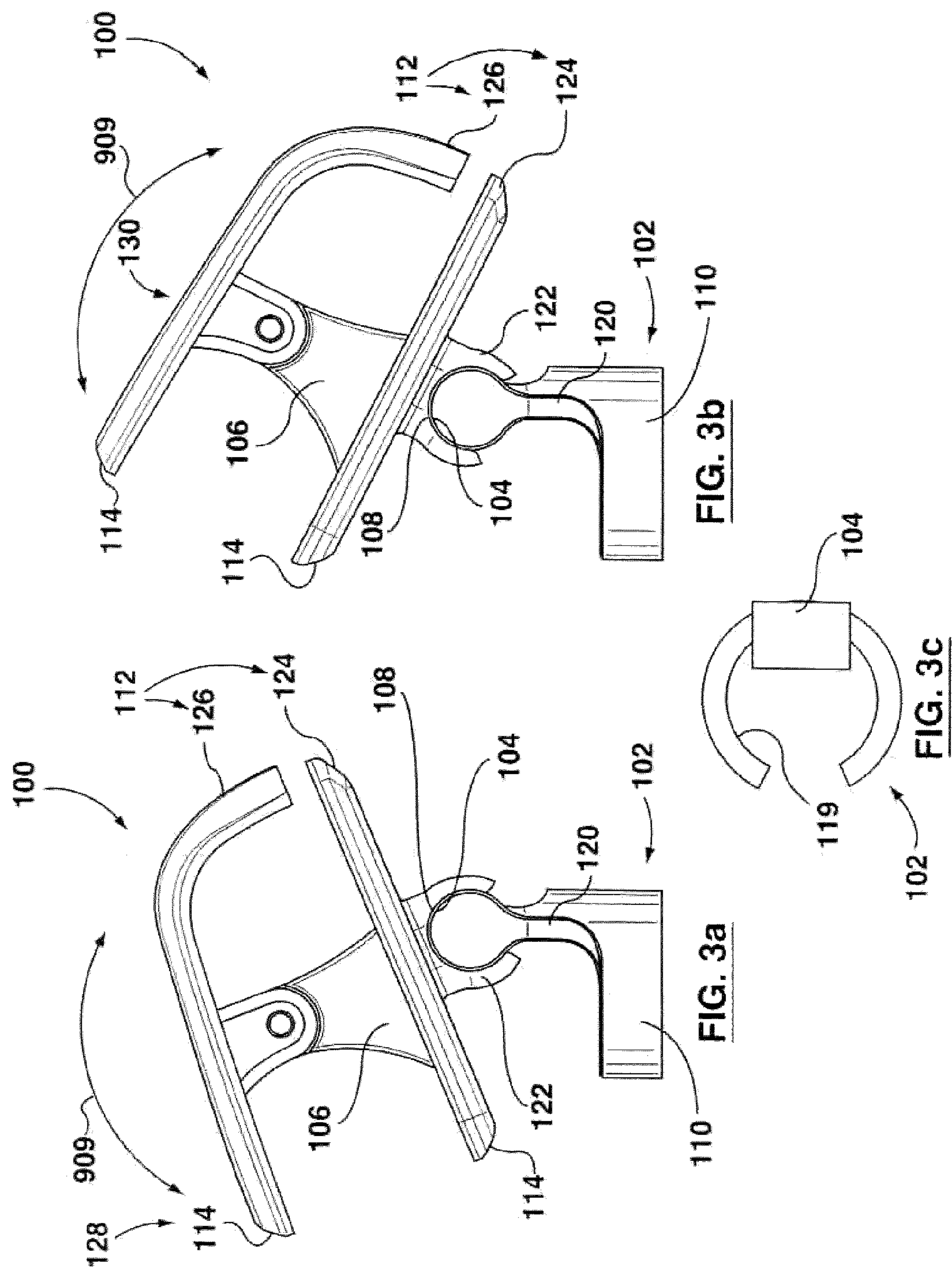
FIG. 3*a* is a side elevational view of a second exemplary embodiment of mounting apparatus according to the invention showing a clamping assembly having clamping jaws modified from those of the first embodiment, with the clamping assembly depicted in a first selected pivoted position.
FIG. 3*b* is a side elevational view similar to FIG. 3*a*, with the clamping assembly depicted in a second selected pivoted position.
FIG. 3*c* is a top plan view of the extension body of the second embodiment shown in isolation.
Figure 3D:
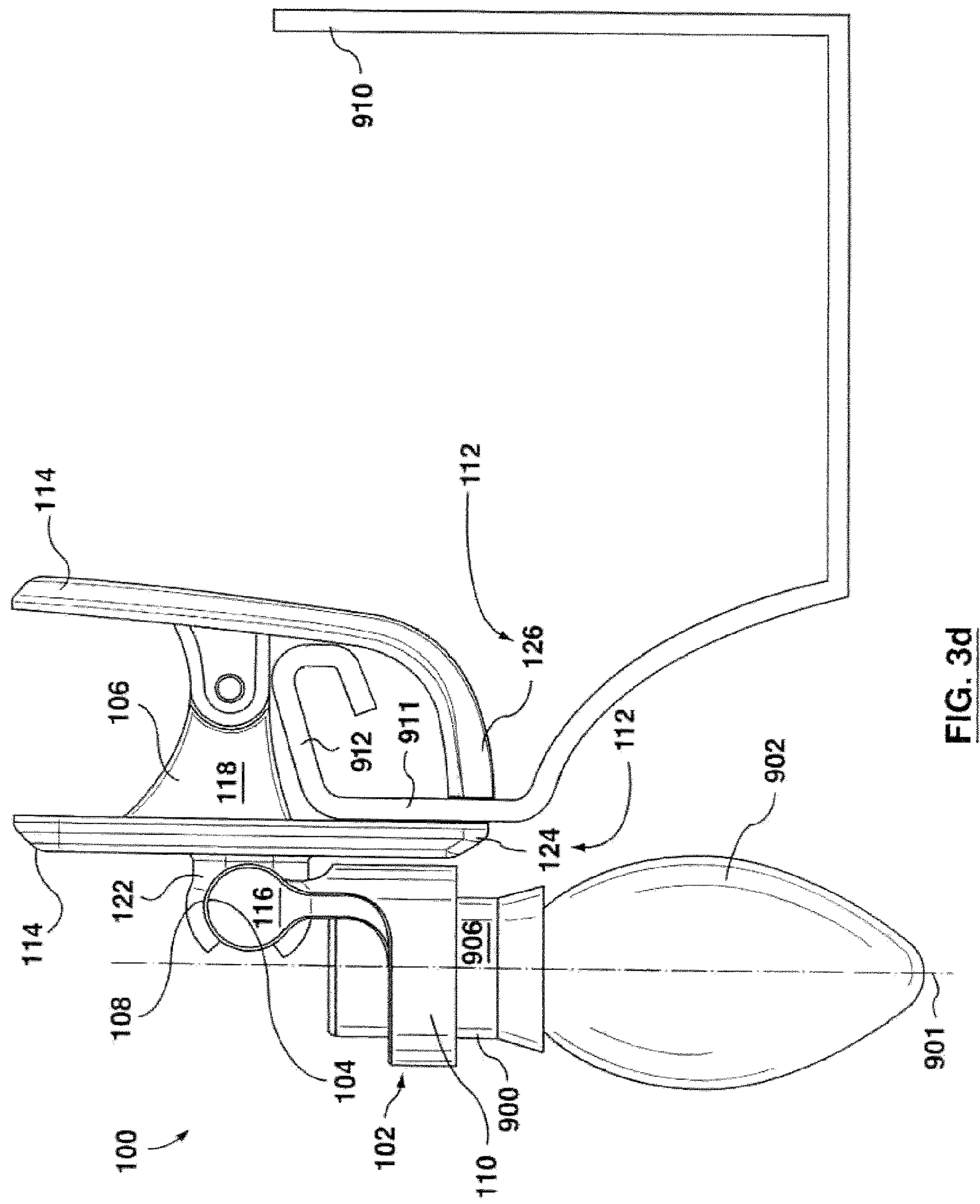
FIG. 3*d* is a side elevational view of the second embodiment shown in use on a sectioned eavestrough, with the electrically conducting wires removed for ease of illustration.

Turning to FIGS. 3*a*-3*d*, inclusive, there is illustrated a second exemplary embodiment of clamping device according to the present invention wherein the clamping assembly 106 includes opposed clamping jaws 112, 112 that have been modified to extend clamp usage to a relatively larger range of clampable environmental items, for example, tree branches and building eavestroughs, than is possible with the first illustrated embodiment. More particularly, as depicted in FIG. 3*d*, the clampable environmental item may include an eavestrough 910 having an outer sidewall 911 with a relatively wide lip portion 912 extending upwardly, inwardly from the top of the outer sidewall 911. The opposed clamping jaws 112, 112 are configured to clamp the opposite sides of the outward sidewall 911 of the eavestrough 910 (and to encompass the relatively wide lip portion 912). More specifically, the opposed clamping jaws 112, 112 of the second embodiment include a substantially flat first jaw portion 124, and a curved second jaw portion 126 that extends away (in an arched manner or an over-arching manner) from the flat jaw portion 124. The flat jaw portion 124 and the second curved jaw portion 126 of the second embodiment are spring biased by a biasing member 107 towards a clamped state in the same general manner as with the first embodiment illustrated in FIGS. 2*a*-2*i*, but such biasing member 107 has been omitted from FIGS. 3*a*-3*c* for ease of illustration.

With this modified arrangement, the flat jaw portion 124 provides a substantially flat surface configured to firmly abut the flat outer sidewall 911 surface of the eavestrough 910, and the second jaw portion 126 advantageously provides a sufficiently curved or arched profile to accommodate placement of the relatively wide lip portion 912 between itself and the first jaw portion 124. This not only provides for firm clamping of the apparatus 100 to the eavestrough 910, but also readily provides for a consistent orientation of the light-emitting device 902 relative to the outer sidewall 911 that is substantively constant relative to other instances of the light-emitting devices 902 in a string of decorative festive lights 904 that may be similarly clamped to the eavestrough 910.

Referring to FIGS. 3*a* and 3*b*, the first arcuate surface 104 and the second arcuate surface 108 frictionally pivotally contact, at least in part, each other with sufficient rotating friction. This is done in such a way that the extension body 102 and the clamping assembly 106 remain frictionally positionable and movable relative to each other. The second arcuate surface 108 is formed on a C-shaped portion 122. The C-shaped portion 122 extends from the clamping assembly 106. The first arcuate surface 104 is formed on a shaft portion 120 extending from the extension body 102. The first arcuate surface 104 and the second arcuate surface 108 are frictionally movable relative to each other in response to the intentional repositioning of the extension body 102 and the clamping assembly 106 relative to each other.

Referring still to the second embodiment depicted in FIGS. 3*a* and 3*b*, the first arcuate surface 104 and the second arcuate surface 108 frictionally pivotally contact, at least in part, each other with sufficient rotating friction. This is done in such a way that the extension body 102 and the clamping assembly 106 remain positioned relative to each other in the absence of any intentional repositioning of the extension body 102 and the clamping assembly 106 relative to each other. More specifically, the first arcuate surface 104 and the second arcuate surface 108 remain frictionally fixed at a stationary position relative to each other in response to the absence of forced pivotal movement of the extension body 102 and the clamping assembly 106.

The first arcuate surface 104 and the second arcuate surface 108 are frictionally movable relative to each other in response to the intentional repositioning of the extension body 102 and the clamping assembly 106 relative to each other. More specifically, the first arcuate surface 104 and the second arcuate surface 108 are pivotally movable relative to each other in response to forced pivotal movement of any one of the extension body 102 and the clamping assembly 106. This is done in such a way that the extension body 102 and the clamping assembly 106 are pivotally movable and frictionally overcome a frictional effect provided between the first arcuate surface 104 and the second arcuate surface 108.

The first arcuate surface 104 and the second arcuate surface 108 are configured to permit selective pivotal movement of the extension body 102 between, for example, a first selected pivoted position 128 (as depicted on one side of center in FIG. 3*a*) and, for example, a second selected pivoted position 130 (as depicted in the opposite side of center in FIG. 3*b*) in which the extension body 102 and the clamping assembly 106 remain frictionally fixed in position relative to each other (along with any selected point between the first selected pivoted position 128 and the second selected pivoted position 130).

The first arcuate surface 104 and the second arcuate surface 108 are configured to frictionally pivotally connect and permit pivotal movement of the extension body 102 with the clamping assembly 106 between the first selected pivoted position 128 and the second selected pivoted position 130 in which the extension body 102 and the clamping assembly 106 remain frictionally fixed in position relative to each other (along any selected point between the first selected pivoted position 128 and the second selected pivoted position 130).

The first arcuate surface 104 and the second arcuate surface 108 are configured to permit selected pivotal movement of the extension body 102 and the clamping assembly 106 relative to each other between the first selected pivoted position 128 and the second selected pivoted position 130 in response to an application of a pivoting force 909 (depicted in FIGS. 3*a* and 3*b*) to any one of the extension body 102 and the clamping assembly 106.

It will be further noted from FIGS. 3*a*, 3*b* and 3*c* that, unlike the first embodiment described above and illustrated in FIGS. 2*a*-2*i*, the extension body 102 of the second embodiment does not present oppositely spaced outwardly flared lip portions 103,103 on its sleeve portion 110. These have been omitted in respect of the second embodiment for ease of illustration and to illustrate the entirely optional nature of the lip portions 103,103. The second embodiment is substantially the same as the first embodiment in all other material respects.

Figures 4A, 4B, 4C:
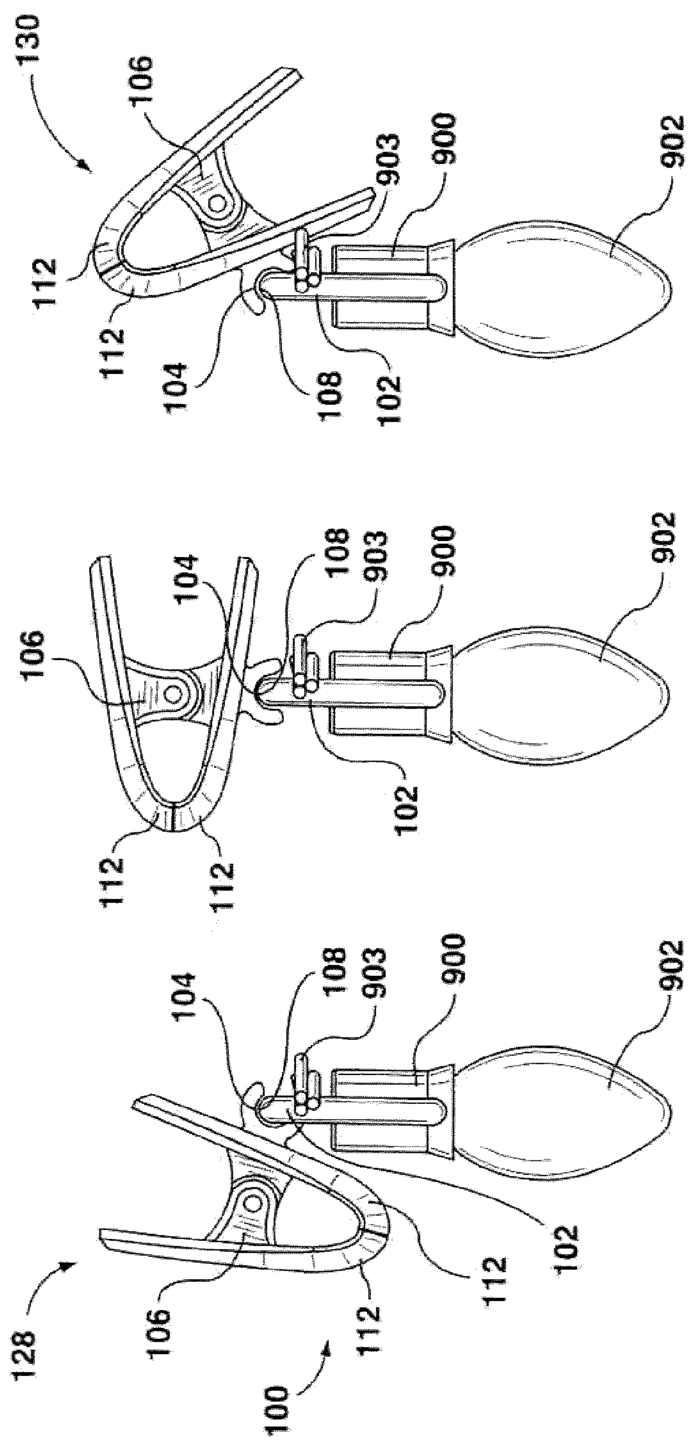
FIGS. 4*a*, 4*b* and 4*c* are side elevational views of a third exemplary embodiment of mounting apparatus according to the present invention with the clamping assembly shown in three respective rotational positions.

Turning to FIGS. 4*a*, 4*b* and 4*c*, inclusive, there is illustrated a third exemplary embodiment of clamping device according to the present invention wherein the extension body 102 has been modified to entirely eliminate the sleeve portion 110 shown in the first two embodiments disclosed herein. In this embodiment, the extension body 102 is integrally formed (molded) as a unitary structure with the light socket assembly 900, and extends upwardly therefrom to define at its vertically upward extent (as seen in FIGS. 4*a*, 4*b* and 4*c*) the first arcuate surface 104. As with the earlier embodiments shown and described herein, the clamping assembly 106 defines (or provides) a second arcuate surface 108. The first arcuate surface 104 and the second arcuate surface 108 are configured to frictionally pivotally contact, at least in part, each other with sufficient rotating friction. This is done in such a way that the extension body 102 and the clamping assembly 106 remain frictionally positionable and movable relative to each other. The clamping assembly 106 provides the opposed clamping jaws 112. The first arcuate surface 104 and the second arcuate surface 108 may be configured to snap fit with each other. The first arcuate surface 104 and the second arcuate surface 108 are configured to permit relative pivotal movement between the light socket assembly 900 and the clamping assembly 106 between a first selected pivoted position 128 (as depicted in FIG. 4*a*) and a second selected pivoted position 130 (as depicted in FIG. 4*c*). The extension body 102 and the clamping assembly 106 remain frictionally fixed in position relative to each other between the first selected pivoted position 128 and the second selected pivoted position 130.

In all other material respects, the third embodiment is substantially and operatively the same as the first and second embodiments disclosed and illustrated herein, or could be readily modified to be so through adoption of the disclosed features and modifications discussed above in respect of said first and second embodiments.

The extension body 102 herein is connectable to (connected to, extendable from) the clamping assembly 106. The scope of the term "connectable" as used in this specification and the appended claims includes (and is not limited to) selectively connectable, slide connectable, pivotally connectable, snap connectable, integrally connectable, rigidly connectable etc. For instance, the meaning of "integrally connectable" includes the extension body 102 integrally formed with (as) a portion of the clamping assembly 106 so as to form a unitary molded assembly. The clamping assembly 106 provides opposed clamping jaws 112 biased against each other. The opposed clamping jaws 112 are biasedly movable relative to each other between a clamped state and an unclamped state as previously described in relation to the various described embodiments.

The extension body 102 is connectable to the light socket assembly 900. The scope of the term "connectable" as used in this specification and claims includes (and is not limited to) selectively connectable, slide connectable, pivotally connectable, snap connectable, integrally connectable, rigidly connectable, etc. For instance, the meaning of "integrally connectable" includes (and is not limited to) the extension body 102 integrally formed with the light socket assembly 900 so as to form a unitary molded body assembly. In accordance with an option, the extension body 102 is fixedly connected to the light socket assembly 900. In accordance with another option, the extension body 102 is further configured to be connected (and selectively disconnected) with the light socket assembly 900. The extension body 102 may be configured to be: (A) connected to the light socket assembly 900 in a connected state; and (B) disconnected from the light socket assembly 900 in a disconnected state. This may be done in a selective manner. In this regard, the extension body 102 and the light socket assembly 900 may be slide engageable with each other.

The clamping assembly 106 extends from the extension body 102. The clamping assembly 106 may be fixedly attached to the extension body 102. A part of the clamping assembly 106 and the extension body 102 may form a single unitary molded body (if desired). The clamping assembly 106 provides the opposed clamping jaws 112.

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It will be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

We claim:

1. A mounting apparatus for a light socket assembly, said apparatus comprising:

an extension body connectable to the light socket assembly, the extension body defining:

a first arcuate surface extending from the extension body; and protrusions spaced apart from each other and extending outwardly from the first arcuate surface;

a clamping assembly having flat zones, with adjacent ones of the flat zones intersecting each other, and with the flat zones together defining:

a segmented second arcuate surface extending from the clamping assembly;

a receiving zone configured to receive the first arcuate surface, with the flat zones facing the interior of the receiving zone; and crevices positioned at intersections between said adjacent ones of the flat zones, with the crevices being configured to detentably interact with the protrusions of the extension body;

the first arcuate surface and the second arcuate surface being each contoured to conform with each other, and the extension body and the clamping assembly being selectively and frictionally positionable at predetermined locations relative to each other whereat the first arcuate surface and the protrusions engage the second arcuate surface, with the protrusions extending into the crevices;

the first arcuate surface and the second arcuate surface being pivotally movable relative to each other in response to intentional repositioning and pivotal movement of the extension body and the clamping assembly relative to each other, such that the protrusions are removed from the crevices and the protrusions resiliently deform the second arcuate surface, with the second arcuate surface disengaging from the first arcuate surface, whereupon there is then an inherently lower friction between the protrusions and the second arcuate surface, than the first arcuate surface and the protrusions have with the second arcuate surface when the extension body and the clamping assembly are positioned in any one of said predetermined locations; and the aforesaid resilient deformation of the second arcuate surface, and the aforesaid lower friction between the protrusions and the second arcuate surface, are such as to together bias the extension body and the clamping assembly into position at said any one of said predetermined locations, whereat the second arcuate surface is then returned from the aforesaid resilient deformation.

2. The apparatus of claim 1, wherein the extension body is selectively connectable to, and removable from the light socket assembly.

3. The apparatus of claim 2, wherein the extension body has a sleeve portion defining an inner surface configured to selectively snap fit with an exterior side wall of the light socket assembly.

4. The apparatus of any one of claims 1-3, wherein:
the clamping assembly has opposed clamping jaws being spring-biased and pivotally movable with opposed clamp handles extending therefrom; and
the second arcuate surface is integrally formed with and extends from a selected one of the opposed clamping jaws.

5. The apparatus of claim 2, wherein the extension body is configured to be rotatably mounted to an outwardly facing groove defined by the light socket assembly once the extension body is received, at least in part, in the outwardly facing groove; and, once received, the extension body is rotatably movable relative to the light socket assembly along a longitudinal axis extending through the light socket assembly.

6. The apparatus of claim 1, wherein the aforesaid bias is such that the extension body and the clamping assembly remain positioned in said any one of said predetermined locations in the absence of any intentional repositioning of the extension body and the clamping assembly relative to each other.

7. The apparatus of claim 1, wherein the aforesaid bias is such that first arcuate surface and the second arcuate surface remain fixed at said any one of said predetermined locations relative to each other in the absence of forced pivotal movement of the extension body and the clamping assembly.

8. The apparatus of claim 1, wherein the protrusions and the second arcuate surface are frictionally movable relative to each other in response to the intentional repositioning and pivotal movement of the extension body and the clamping assembly relative to each other between said predetermined locations.

9. The apparatus of claim 1, wherein the first arcuate surface and the second arcuate surface are pivotally movable relative to each other in response to forced pivotal movement of any one of the extension body and the clamping assembly in such a way that the extension body and the clamping assembly are pivotally movable and frictionally overcome a frictional effect provided between the first arcuate surface and the second arcuate surface.

10. The apparatus of claim 1, wherein the first arcuate surface and the extension body are formed as a molded one-piece body.

11. The apparatus of claim 1, wherein the second arcuate surface and a selected instance of an opposed clamping jaw of the clamping assembly are formed as a molded one-piece body.

12. The apparatus of claim 1, wherein the first arcuate surface and the second arcuate surface are configured to snap fit with each other.

13. The apparatus of claim 1, wherein the second arcuate surface is formed on a C-shaped portion extending from the clamping assembly and the first arcuate surface is formed on a shaft portion extending from the extension body.

14. The apparatus of claim 1, wherein the clamping assembly has opposed clamping jaws which are adapted to admit therebetween, and to securely clamp, any environmental item selected from the group consisting of tree branches and building eavestroughs.

15. The apparatus of claim 14, wherein the opposed clamping jaws comprising a first jaw portion and a second jaw portion, with the first jaw portion and the second jaw portion being together adapted to admit therebetween, and to securely clamp, said any environmental item.

16. The apparatus of claim 15, wherein the first jaw portion has a flat jaw portion, and the second jaw portion has a curved jaw portion extending away from the flat jaw portion, such that the flat jaw portion and the curved jaw portion are together adapted to admit therebetween, and to securely clamp, said any environmental item.

17. The apparatus of claim 1, wherein a sizing of the first arcuate surface relative to the receiving zone and the second arcuate surface is such as to couple the extension body with the clamping assembly.

18. The apparatus of claim 1, wherein the first arcuate surface and the second arcuate surface are configured to permit selective pivotal movement of the extension body between a first selected pivoted position and a second selected pivoted position in which the extension body and the clamping assembly remain frictionally fixed in position relative to each other along any point between the first selected pivoted position and the second selected pivoted position.

19. The apparatus of claim 1, wherein the first arcuate surface and the second arcuate surface are configured to frictionally pivotally connect and permit pivotal movement of the extension body with the clamping assembly between a first selected pivoted position and a second selected pivoted position in which the extension body and the clamping assembly remain frictionally fixed in position relative to each other along any point between the first selected pivoted position and the second selected pivoted position.

20. The apparatus of claim 1, wherein the first arcuate surface and the second arcuate surface are configured to permit selected pivotal movement of the extension body and the clamping assembly relative to each other between a first selected pivoted position and a second selected pivoted position in response to an application of a pivoting force to any one of the extension body and the clamping assembly.

21. The apparatus of claim 1, wherein the extension body provides a C-shaped clip formation having an interior zone, and also having oppositely spaced outwardly flared lip portions forming an entrance leading to the interior zone of the C-shaped clip formation.

22. The apparatus of claim 21, wherein an inwardly facing surface of the C-shaped clip formation is configured to interface with an outwardly facing groove which is defined by an outer wall of the light socket assembly, with the oppositely spaced outwardly flared lip portions fitting, at least in part, within the outwardly facing groove.

23. An apparatus comprising:
a light-emitting device;
a light socket assembly configured to operatively receive the light-emitting device;
an extension body connectable to the light socket assembly, the extension body defining:
a first arcuate surface integrally formed with and extending from the extension body; and
protrusions spaced apart from each other and extending outwardly from the first arcuate surface;
a clamping assembly having flat zones, with adjacent ones of the flat zones intersecting each other, and with the flat zones together defining:
a segmented second arcuate surface being integrally formed with and extending from the clamping assembly;
a receiving zone configured to receive the first arcuate surface, with the flat zones facing the interior of the receiving zone; and
crevices positioned at intersections between said adjacent ones of the flat zones, with the crevices being configured to detentably interact with the protrusions of the extension body;

the first arcuate surface and the second arcuate surface being each contoured to conform with each other, and the extension body and the clamping assembly being selectively and frictionally positionable at predetermined locations relative to each other whereat the first arcuate surface and the protrusions engage the second arcuate surface, with the protrusions extending into the crevices;

the first arcuate surface and the second arcuate surface being pivotally movable relative to each other in response to intentional repositioning and pivotal movement of the extension body and the clamping assembly relative to each other, such that the protrusions are removed from the crevices and the protrusions resiliently deform the second arcuate surface, with the second arcuate surface disengaging from the first arcuate surface, whereupon there is then an inherently lower friction between the protrusions and the second arcuate surface, than the first arcuate surface and the protrusions have with the second arcuate surface when the extension body and the clamping assembly are positioned in any one of said predetermined locations; and the aforesaid resilient deformation of the second arcuate surface, and the aforesaid lower friction between the protrusions and the second arcuate surface, are such as to together bias the extension body and the clamping assembly into position at said any one of said predetermined locations, whereat the second arcuate surface is then returned from the aforesaid resilient deformation.

24. The apparatus of claim 23, wherein:

an outer wall of the light socket assembly presents an outwardly facing circumferential groove;

the extension body provides a C-shaped clip formation having an interior zone; and the outwardly facing groove is configured to interface with the C-shaped clip formation so as to receive the C-shaped clip formation within the outwardly facing groove to releasably connect the extension body to the socket assembly.

25. The apparatus of claim 24, wherein the C-shaped clip formation has oppositely spaced outwardly flared lip portions forming an entrance leading into the interior zone of the C-shaped clip formation, said lip portions contacting, at least in part, the outwardly facing groove to assist with initial reception of the C-shaped clip formation within the outwardly facing groove.

* * * * *